W. M. CAMPBELL, Jr.
DOG CONTROLLING MEANS.
APPLICATION FILED MAR. 18, 1919.
1,308,332.
Patented July 1, 1919.
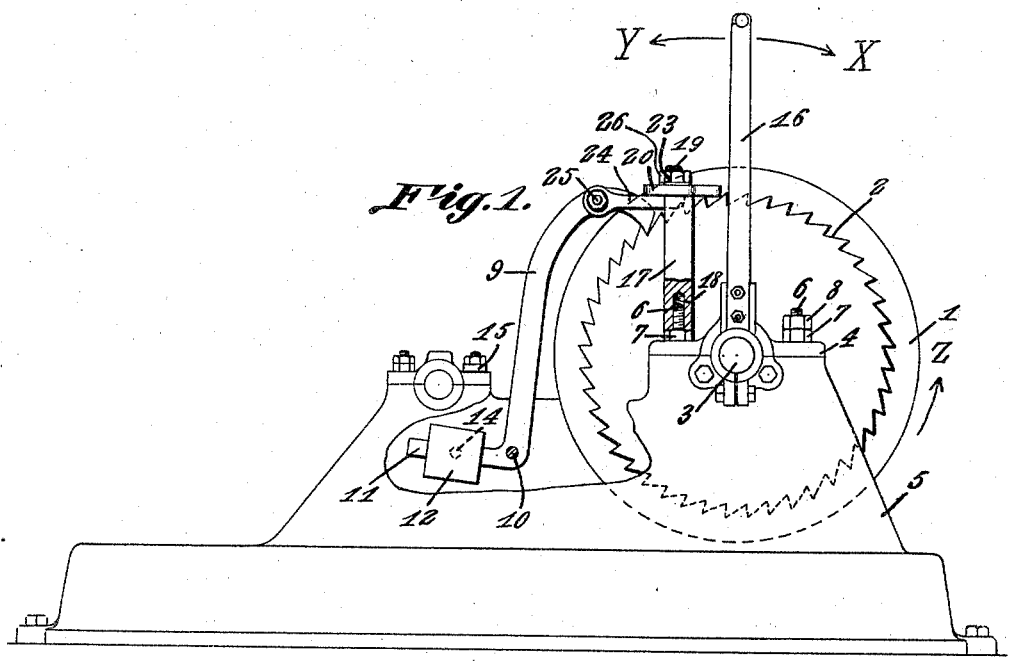
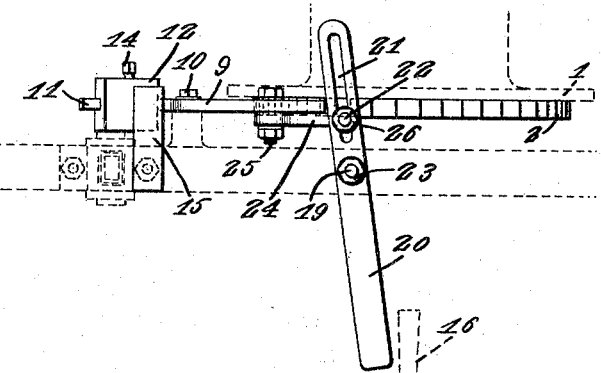
Inventor.
W.M. Campbell, Jr.

UNITED STATES PATENT OFFICE.

WILLIAM M. CAMPBELL, JR., OF BALTIMORE, MARYLAND.

DOG-CONTROLLING MEANS.

1,308,332.     Specification of Letters Patent.     Patented July 1, 1919.

Application filed March 18, 1919. Serial No. 283,337.

*To all whom it may concern:*

Be it known that I, WILLIAM M. CAMPBELL, Jr., a citizen of the United States, residing at Baltimore, in the State of Maryland, have invented a new and useful Dog-Controlling Means, of which the following is a specification.

By way of explanation it may be stated that hoisting machines of a certain well known type are provided with a dog which, coöperating with a ratchet wheel on the drum, holds the drum against rotation. The dog is adapted to disengage itself automatically from the ratchet wheel, under certain conditions, but no means is provided for restoring the dog to operative engagement with the ratchet wheel when the clutch lever which couples up the drum with the actuating means is so positioned that there is no driving connection between the shaft and the drum.

In view of the foregoing, the invention aims to provide a simple means whereby when the lever is so positioned that there is no driving connection between the shaft and the drum, the dog will be engaged with the ratchet wheel by direct operation of the lever.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention assembled with a portion of a hoisting machine of known construction, parts being broken away; and Fig. 2 is a top plan wherein the device forming the subject matter of this application appears.

The numeral 1 denotes a drum, wherewith a ratchet wheel 2 is operatively connected in any desired manner. Ordinarily the ratchet wheel 2 is connected to or formed integrally with one end of the drum 1. The drum is carried by a shaft 3 journaled in a bearing 4 connected to a frame 5 by studs 6, nuts 7 and lock nuts 8. A dog 9 coöperates with the ratchet wheel 2 and is pivoted at 10 to the frame 5, or otherwise supported. The dog 9 has an angularly disposed end 11 on which a counter-weight 12 is adjustable, the weight being held in adjusted positions on the end 11 of the dog 9 by means of a set screw 14 or otherwise. A stop 15 is mounted on the frame 5 and limits the rearward movement of the dog 9, under the action of the weight 12, when the dog swings out of engagement with the ratchet wheel 2. The numeral 16 denotes a clutch lever, operatively connected with suitable means (not shown but common in the art) whereby the drum 1 may be operatively connected to the shaft 3, so that when the shaft 3 is rotated, the drum 1 will be rotated likewise.

The numeral 17 denotes a support, preferably in the form of a post, provided in its lower end with a threaded socket 18. One of the lock nuts 8 is removed, and the end of the corresponding stud 6 is received in the socket 18, to hold the support 17 in the upright position shown in Fig. 1. At its upper end, the support 17 carries a stud 19 forming a fulcrum for a horizontally swinging lever 20, the lever being held on the stud 19 for swinging movement, by means of a nut 23 threaded on the stud. At its inner end, the lever 20 is supplied with a longitudinal slot 21 wherein operates a projection 22 carrying a nut 26, the projection forming a part of a connection 24 pivoted at 25 to the dog 9, near to the upper end thereof.

In practical operation, when the lever 16 is swung in the direction of the arrow X, the drum 1 is coupled to the shaft 3, and the drum is rotated in the direction of the arrow Z to effect a reeling in of the cable. The dog 9 then swings out of engagement with the ratchet wheel 2 and into engagement with the stop 15, under the action of the weight 12. When the lever 16 is swung in the direction of the arrow Y to disconnect the drum 1 from the shaft 3, so that the drum is no longer rotated by the shaft, then the lever 16 engages the outer end of the lever 20 and swings the lever 20 on its fulcrum 19 the projection 22 moving in the slot 21, and the part 24 drawing the dog 9 downwardly and forwardly until the dog coöperates with the ratchet wheel 2.

The device forming the subject matter of this application is adapted to be assembled with hoisting machines of widely different sorts, and forms a means whereby, when the lever 16 is shifted in one direction, the dog 9 will be brought into engagement with the ratchet wheel 2. The lever 16 is frequently operated from a distance, and, when the device hereinbefore described is used, the dog 9 is automatically engaged with the ratchet wheel 2, and it is unnecessary for an operator to walk and throw in the dog by hand.

Having thus described the invention, what is claimed is:—

1. In a device of the class described, a shaft; a drum; a clutch lever for connecting the drum to the shaft; a dog controlling the rotation of the drum; a second lever operated by the clutch lever; a fulcrum for the second lever; a connection between the second lever and the dog; and automatically operating means independent of the lever and the connection for moving the dog out of operative relation to the drum.

2. The combination with a shaft, a drum, a clutch lever for connecting the drum to the shaft, and a dog controlling the rotation of the drum, of a second lever; a fulcrum for the second lever, and an operative connection between one end of the second lever and the dog whereby the dog will be moved into operative relation to the drum, the other end of the second lever lying in the path of the clutch lever.

In testimony that I claim the foregoing as my own, I have hereto affixed my signature in the presence of two witnesses.

WILLIAM M. CAMPBELL, Jr.

Witnesses:
 HARRY E. SENN,
 W. E. CAMPBELL.

Copies of this patent may be obtained for five cents each, by addressing the "Commissioner of Patents, Washington, D. C."